(12) United States Patent
Heo

(10) Patent No.: US 9,606,823 B2
(45) Date of Patent: Mar. 28, 2017

(54) ADAPTIVE INTERRUPT AND SYSTEM CALL COALESCING

(71) Applicant: VMware, Inc., Palo Alto, CA (US)

(72) Inventor: Jin Heo, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 168 days.

(21) Appl. No.: 14/101,250

(22) Filed: Dec. 9, 2013

(65) Prior Publication Data
US 2015/0160958 A1 Jun. 11, 2015

(51) Int. Cl.
*G06F 9/455* (2006.01)
*G06F 9/50* (2006.01)

(52) U.S. Cl.
CPC ........... *G06F 9/45558* (2013.01); *G06F 9/50* (2013.01); *G06F 9/45516* (2013.01); *G06F 9/5077* (2013.01); *G06F 2009/45575* (2013.01); *G06F 2009/45591* (2013.01)

(58) Field of Classification Search
CPC ......................................... G06F 9/455–9/5094
See application file for complete search history.

(56) References Cited

U.S. PATENT DOCUMENTS

| | | | | |
|---|---|---|---|---|
| 2007/0033589 A1* | 2/2007 | Nicholas | ............. | G06F 9/45533 718/1 |
| 2010/0223611 A1* | 9/2010 | Mahalingam | ....... | G06F 9/45537 718/1 |
| 2010/0274940 A1* | 10/2010 | Ahmad | ............... | G06F 9/45558 718/1 |
| 2011/0093637 A1* | 4/2011 | Gupta | ................... | G06F 9/4812 710/263 |
| 2011/0145462 A1* | 6/2011 | Mukherjee | ............ | G06F 9/4812 710/269 |
| 2011/0179413 A1* | 7/2011 | Subramanian | ...... | G06F 9/45558 718/1 |
| 2012/0174097 A1* | 7/2012 | Levin | .................... | G06F 9/5077 718/1 |
| 2013/0290971 A1* | 10/2013 | Chen | ..................... | G06F 9/5033 718/102 |
| 2014/0359185 A1* | 12/2014 | Sawal et al. | .................. | 710/264 |

OTHER PUBLICATIONS

Dong, Yaozu, et al., "Optimizing Network I/O Virtualization with Efficient Interrupt Coalescing and Virtual Receive Side Scaling", 2011, pp. 26-34.*

(Continued)

*Primary Examiner* — Thuy Dao
*Assistant Examiner* — Christopher Franco

(57) ABSTRACT

Exemplary methods, apparatuses, and systems determine a virtual processing unit utilization value representing utilization for a first virtual machine of a plurality of virtual machines running on a host computer. A host processing unit utilization value representing utilization for the host computer including the plurality of virtual machines running on the host computer is also determined. A target coalescing rate is selected based upon the virtual processing unit utilization and host processing unit utilization values. A coalescing rate or a coalescing depth for the first virtual machine is updated based upon the selected target coalescing rate.

20 Claims, 3 Drawing Sheets

(56) References Cited

OTHER PUBLICATIONS

Guan, Haibing, et al., "Performance Enhancement for Network I/O Virtualization with Efficient Interrupt Coalescing and Virtual Receive-Side Scaling", Dec. 2012, pp. 1118-1128.*
Huang, Zhiqiang, et al., "Adaptive and Scalable Optimizations for High Performance SR-IOV", 2012, pp. 459-467.*
Ahmad, Irfan, et al., "Improving Performance with Interrupt Coalescing for Virtual Machine Disk IO in VMware ESX Server", 2009, pp. 1-9.*
Brugmann, Klaus, et al., "Graceful Anytime Interruptibility for Virtual Agents", 2007, pp. 284-285.*
Fajjari, Ilhem, et al., "Adaptive-VNE: A flexible resource allocation for virtual network embedding algorithm", 2012, pp. 2640-2646.*
Abdelzaher et al., Performance Guarantees for Web Server End-Systems: A Control-Theoretical Approach, IEEE Transactions on Parallel and Distributed Systems, 2001, 21 pages.
Diao et al., A Control Theory Foundation for Self-Managing Computing Systems, IEEE Journal on Selected Areas in Communications, vol. 23, No. 12, Dec. 2005, pp. 2213-2222.
Heo et al., Memory Overbooking and Dynamic Control of Xen Virtual Machines in Consolidated Environments, Proceedings of the 11th IFIP/IEEE international conference on Symposium on Integrated Network Management, p. 630-637, Jun. 1-5, 2009, 8 pages.
Zhu et al., Utility-Driven Workload Management using Nested Control Design, HP Laboratories Palo Alto, HPL-2005-193(R.1), Mar. 29, 2006, 9 pages.
Network I/O Latency on VMware vSphere 5, Performance Study, Technical White Paper, VMware, 2012, 15 pages.
Interrupt coalescing, AIX documentation, pSeries and AIX Information Center, IBM, downloaded on Nov. 22, 2013.

* cited by examiner

ADAPTIVE INTERRUPT AND SYSTEM CALL COALESCING

FIELD OF THE INVENTION

The various embodiments described herein relate to interrupt and system call coalescing. In particular, embodiments relate to an adaptive approach to coalescing for a virtual network interface card.

BACKGROUND OF THE INVENTION

Interrupt coalescing is a technique that is used to reduce processing unit overhead by batching requests and using single interrupt for each batch. This technique effectively limits the interrupt rate and, therefore, the overhead of interrupt processing. While the current approaches generally reduce processing unit overhead, they do not handle certain corner cases well, leading to sub-optimal application performance and inefficient system-wide resource utilization.

For example, one approach to coalescing sets a static value for the size of each batch of requests (referred to herein as "depth" or "coalescing depth"). The rate at which interrupts are generated (referred to herein as "coalescing rate") is then determined by the quotient of the rate at which requests are received and the static depth value. When the system is lightly loaded, the coalescing rate will be low and requests may be delayed as the system waits for additional requests to meet the static depth. Such a delay is undesirable if a latency-sensitive workload is running. On the other hand, if the static depth is set to a smaller value and the system is heavily loaded, the processing unit will suffer from the overhead of the higher interrupt rate.

In another approach, the system determines a variable depth based upon a quotient of the actual number of requests and a static coalescing rate. As a result, a high number of requests results in a greater depth and a low number of requests results in a smaller depth. Under this approach, however, the system suffers a similar problem to the static depth approach described above. A lightly loaded system running a latency-sensitive workload may still need a higher interrupt rate than provided by the fixed coalescing rate. Conversely, the fixed coalescing rate may result in the processing unit still being inefficiently burdened by the overhead of the interrupts when the system is heavily loaded.

The implications of interrupt coalescing are further complicated in a virtual computing environment. For example, a host computer may run as many as one thousand virtual machines, each of which is generating interrupt requests. If each virtual machine is generating thousands of requests a second, the virtualization software (upon which all of the virtual machines run and rely for access to physical resources) receives millions of requests per second. As a result of the magnitude of requests, the virtual computing environment is likely to experience a greater variance in the load on the system and, therefore, the aforementioned corner cases.

SUMMARY OF THE INVENTION

Exemplary methods, apparatuses, and systems include a host computer determining a virtual processing unit utilization value representing utilization for a first virtual machine of a plurality of virtual machines running on a host computer. The host computer further determines a host processing unit utilization value representing utilization for the host computer including the plurality of virtual machines running on the host computer. The host computer selects a target coalescing rate based upon the virtual processing unit utilization and host processing unit utilization values. The host computer updates a coalescing rate or a coalescing depth for the first virtual machine based upon the selected target coalescing rate. In one embodiment, the coalescing rate is equal to a rate of events to be processed divided by the first coalescing depth.

For example, the host computer calculates the virtual processing unit utilization value as a weighted sum of (a) utilization of all virtual processing units that receive interrupts for packets received for the first virtual machine and completion of packets transmitted for the first virtual machine, (b) utilization of the all virtual processing units that are used to transmit packets for the first virtual machine, and (c) average utilization of all virtual processing units of the first virtual machine. The host computer calculates the host processing unit utilization value as a weighted average of processing unit utilization of all physical processing units in the host computer. The host computer selects the target coalescing rate by calculating a score equal to the virtual processing unit utilization weighted sum and host processing unit utilization weighted average and selecting (e.g., from a look-up table) a target coalescing rate corresponding to the calculated score.

In one embodiment, the host computer updates the coalescing depth based upon the selected target coalescing rate by gradually increasing or decreasing the coalescing depth to result in the coalescing rate approaching the selected target coalescing rate. For example, the host computer uses an integral controller or other feedback loop to gradually adjust the coalescing depth, causing the coalescing rate to gradually converge upon or at least move towards the target coalescing rate.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein implement adaptive interrupt and system call coalescing. In particular, embodiments implement adaptive coalescing for the virtual network interface cards of virtual machines running on a host computer. For example, the host computer determines a combination of physical and virtual central processing unit utilization values. The combined utilization values, for a given virtual machine, represent utilization for that virtual machine as well as system-wide utilization for the host computer. Using the combined utilization values, the host computer determines a target coalescing rate for interrupts or system calls for each virtual network interface card. The host computer uses each target coalescing rate to update the current coalescing depth or coalescing rate for each virtual machine. As a result, the host computer is able to dynamically minimize the overhead of interrupt and system call processing and maximize system-wide throughput based upon changing workloads.

Figure 1:
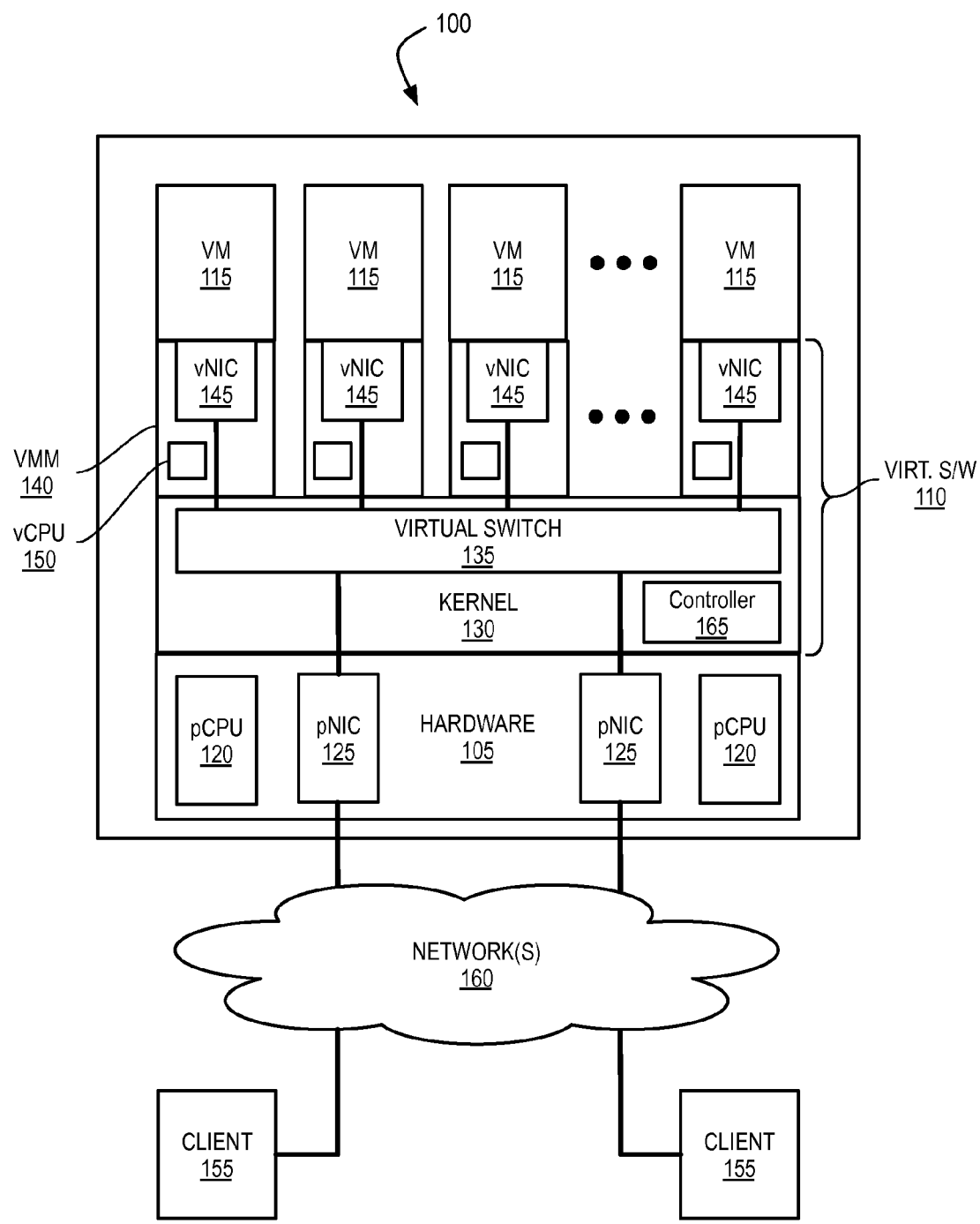
FIG. 1 illustrates, in block diagram form, an exemplary host computer implementing an adaptive approach to interrupt and system call coalescing.

FIG. 1 illustrates, in block diagram form, exemplary host computer 100 implementing an adaptive approach to interrupt and system call coalescing. Host computer 100 includes hardware 105, virtualization software 110 (e.g., a hypervisor) running on hardware 105, and one or more virtual machines 115 running on virtualization software 110. Hardware 105 includes one or more physical central processing units (pCPUs) 120 and one or more physical network interface cards (pNICs) 125.

Virtualization software 110 includes kernel layer 130, which implements virtual switch 135 and manages physical resources for VMs 115, including maintaining virtual-to-physical hardware mappings. Virtualization software 110 further includes one or more virtual machine monitors (VMMs) 140, which implement virtual network interface cards (vNICs) 145, virtual central processing units (vCPUs) 150, and otherwise manage virtual resources for VMs 115.

VMs 115 are complete computation environments, containing or otherwise utilizing virtual equivalents of the hardware and system software components of a physical system. Additionally, VMs 115 are typically implemented by an extensive virtualization infrastructure. In one embodiment, host computer 100 is a part of a virtualization environment providing server-based computing. Server-based computing allows client devices 155 to access, via network(s) 160 (e.g., a local area network or other private or publically accessible wide area network, such as the Internet), network services implemented by VMs 115. For example, VMs 115 may implement web servers, virtual desktops, or another network service accessed by a client 155 or another VM 115 (within host computer 100 or another host computer).

In providing a network service, VMs 115 transmit and receive packets via vNICs 145, virtual switch 135, and pNICs 125. For example, when a VM 115 transmits a packet via a virtual resource, e.g. vNIC 145, VMM 140 stores the packet in a portion of memory shared with kernel 130 and traps into kernel 130 by making a system call (e.g., a call to transfer the packet from VMM 140 to kernel 130). Kernel 130 in turn provides the packet to a physical resource, e.g., pNIC 125. Once the packet is processed by kernel 130, kernel 130 generates a (virtual) interrupt to notify the VM 115 that it can release the packet. Similarly, for receiving a packet, when kernel 130 receives the packet from pNIC 125, another (virtual) interrupt is generated when kernel 130 places the packet into the shared memory for vNIC 145 in the VMM 140. Given that each of transmission or reception of a packet includes generating an interrupt and/or system call and that there may be on the order of one thousand VMs running on a given host computer 100, interrupt/system call coalescing has a significant impact on the amount of interrupt processing occurring within the host computer 100.

To dynamically minimize interrupt and system call processing, virtualization software 110 implements adaptive coalescing. For example, kernel 130 includes controller 165, which selects a target coalescing rate based upon processing unit utilization and adjusts the coalescing depth or coalescing rate for a vNIC 145 as described in greater detail below.

Figure 2:
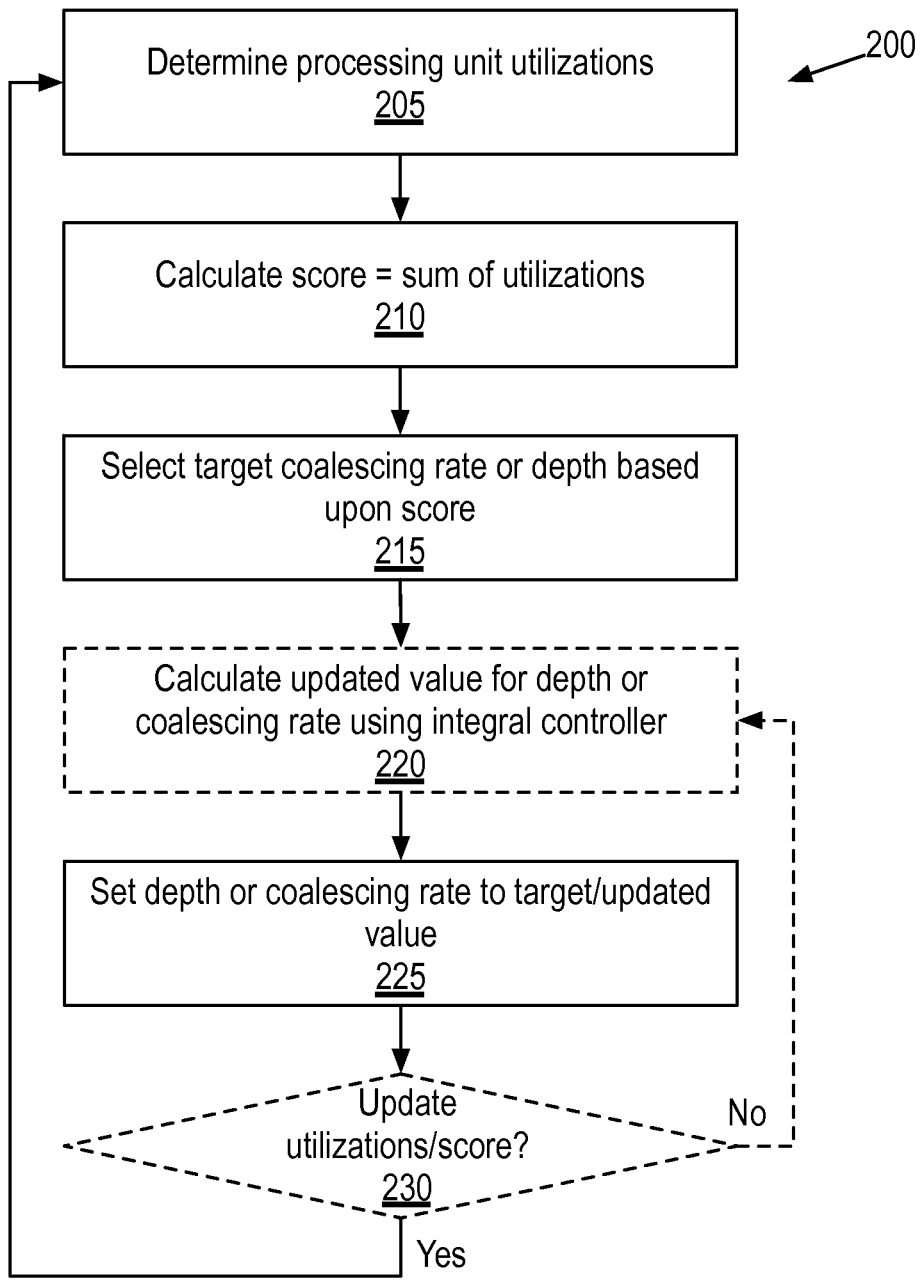
FIG. 2 is a flow chart illustrating an exemplary method of an adaptive approach to interrupt and system call coalescing.

FIG. 2 is a flow chart illustrating exemplary method 200 of adaptive interrupt and system call coalescing. At block 205, the host computer determines processing unit utilization values for one or more processing units. For example, processing unit utilization may be represented as a percentage of CPU cycles the processing unit is working (as opposed to idle). Processing unit utilization represents the current load on the CPUs, rather than simply looking at a network event/packet rate. The current load, however, is a good indication of the packet rate. Additionally, given that the goal of coalescing is to reduce CPU load, it is desirable to utilize the current load to determine a target coalescing rate.

In one embodiment, the host computer determines a first utilization value representing utilization of one or more vCPUs by a first VM of a plurality of VMs running on the host computer. For example, the vCPU utilization represents utilization only on behalf of the first VM. In one embodiment, vCPU utilization is mapped to utilization of a portion of one or more pCPUs. For example, a vCPU may be dynamically mapped to a set of one or more cores of a multicore pCPU based upon demand, priority, etc. Determining utilization of the vCPU includes determining the utilization of the set of one or more cores currently mapped to the vCPU. The host computer further determines a host processing unit utilization value representing utilization of one or more pCPU(s) by the host computer generally, including the plurality of VMs running on the host computer.

At block 210, the host computer calculates a score equal to the sum of the determined utilization values. The combination of the vCPU utilization value(s) for a given VM and the pCPU utilization values for the host computer (as a whole) enables the host computer to set the coalescing rate for the VM to maximize throughput not only for that VM but also for the entire host computer. For example, the score may be equal to the sum of a first weighted value multiplied by the average utilization of all vCPUs of the first VM and a second weighted value multiplied by the average utilization of all pCPUs in the host computer ((w1*avg_vCPU)+(w2*avg_pCPU)). The values assigned to weights w1 and w2 are selected to distribute the contribution of each determined utilization. In one embodiment, w1=0.5 and w2=0.5. Alternatively, one or more weights are assigned another set of values or not used (e.g., setting a weight equal to 1 is equivalent to not using that weight).

In one embodiment, the vCPU utilization value includes additional utilizations. For example, there are cases when vCPU utilization for one or more of transmitting packets, receiving packets, and receiving transmission completion messages. In one embodiment, the first virtual processing unit utilization value is a weighted sum of (a) the utilization of all vCPUs that receive interrupts for packets received for the first VM and completion of packets transmitted for the first VM (rxNtxComp_vCPU), (b) the utilization of the all vCPUs that are used to transmit packets for the first VM (tx_vCPU), and (c) the average utilization of all vCPUs of the first VM (avg_vCPU). Additionally, the host processing unit utilization value is a weighted average processing unit utilization of all pCPUs in the host computer (avg_pCPU). For example, the host computer calculates a score equal to w1*avg_pCPU+w2*tx_vCPU+w3*rxNtxComp_vCPU+w4*avg_vCPU. The values assigned to weights w1, w2, w3, and w4 are selected to distribute the contribution of each determined utilization. In one embodiment, w1=0.5, w2=0.125, w3=0.25, and w4=0.125. Alternatively, the weights are evenly distributed (e.g., each set to 0.25), assigned another set of values, or one or more weights are not used.

In one embodiment, calculating the score further includes decreasing the score by a fixed or variable value when a current rate of events/packets to be processed is below a threshold. This use of a threshold enables the host computer to handle a corner case in which the VM's load is high (corresponding to a high processing utilization) but the network traffic is low and time-critical. For example, consider a workload that is CPU-intensive without generating much network traffic and that uses a (low rate) heartbeat to check the healthiness of peer systems. In this case, the calculated score can overestimate the network load, leading to an unnecessarily higher coalescing rate and thereby a higher delay for the time-critical heartbeat traffic. To handle such a corner case, the score described above may be refined, for example, by subtracting a constant value multiplied by rxNtxComp_vCPU squared and divided by the sum of the current transmission rate and the current reception rate. If the threshold value=20,000, the updated score=score−20,000*rxNtxComp_vCPU$^2$/(txRate+rxRate). When the combined packet rate of transmission and reception is over the threshold, e.g., 20,000, the score adjustment is less than one and therefore minimal. If the combined rate is below the threshold, however, the score is adjusted in a meaningful way when rxNtxComp_vCPU is high enough.

In one embodiment, the score is calculated at a periodic interval. For example, the score may be calculated every second. Additionally, utilization values may be determined every second.

At block 215, the host computer selects a target coalescing rate or depth based upon the first virtual processing unit utilization value and the host processing unit utilization value. As described above, the coalescing rate is equal to a rate of events to be processed (e.g., packets received, packets transmitted, packet transmission completions, etc.) divided by the first coalescing depth. For example, the target coalescing rate may be selected by mapping the calculated score to a target coalescing rate. In one embodiment, the host computer uses a lookup table to map the calculated score to a target coalescing rate. If scores range from 0 to 100, the following table provides an exemplary mapping of scores to target coalescing rates.

| Score (S) | Target rate |
|---|---|
| 0 < S ≤ 12.5 | 16,000 |
| 12.5 < S ≤ 25 | 8,000 |
| 25 < S ≤ 37.5 | 4,000 |
| 37.5 < S ≤ 50 | 4,000 |
| 50 < S ≤ 62.5 | 2,000 |
| 62.5 < S ≤ 75 | 2,000 |
| 75 < S ≤ 87.5 | 1,000 |
| 87.5 < S ≤ 100 | 1,000 |

In alternative embodiments, score ranges may be unequal, different ranges may be selected, and/or different target rates may be mapped to the score ranges. For example, another set of target rates may be used to provide a higher target coalescing rate when the score represents a light processing load/utilization and a lower target coalescing rate when the score represents a heavy processing load/utilization.

At block 220, the host computer optionally calculates an updated value for the coalescing depth or the coalescing rate based upon the target coalescing rate or depth. For example, to avoid large increases or decreases in the coalescing rate, the host computer calculates one or more updated values to gradually increase or decrease the coalescing rate until the coalescing rate approaches/converges upon the target coalescing rate or a new target coalescing rate is calculated. In one embodiment, the host computer uses or implements an integral controller to gradually increase or decrease the coalescing depth or the coalescing rate. For example, the host computer may calculate an updated coalescing depth according to the following equation: updated depth=current depth−(target coalescing rate−current coalescing rate)/gain constant. In one embodiment, the gain constant is 2^(gainNParam). If gainParam is 4, the equation will be: updated depth=current depth−(target coalescing rate−current coalescing rate)/16. Similarly, if gainParam is 9, the equation will be: updated depth=current depth−(target coalescing rate−current coalescing rate)/512. Alternatively, the host computer gradually increases or decreases the coalescing depth or the coalescing rate using fixed incremental values, incremental values based upon a percentage of the difference between the target coalescing rate and the current coalescing rate, or another variable incremental value to cause the coalescing rate to gradually approach/converge upon the target coalescing rate.

In one embodiment, the host computer calculates the updated value for the coalescing depth or rate at a periodic rate that is greater than the rate at which the score is calculated. For example, if the score is calculated every second, an updated value for the coalescing depth or rate is calculated multiple times a second. As a result, the coalescing rate or depth can be gradually adjusted multiple times prior to the selection of a new target coalescing rate or depth. In one embodiment, the host computer calculates an updated value for the coalescing depth or the coalescing rate every 200 milliseconds.

At block 225, the host computer updates the coalescing depth or the coalescing rate to the value determined at block 220 or, alternatively, directly to the target coalescing rate or depth. For example, the host computer updates the coalescing depth or the coalescing rate for one or more vNICs for the VM that corresponds to the vCPU utilization described above. If a vNIC includes multiple queues, each queue is updated to the target/updated value for the coalescing depth or rate.

At block 230, the host computer optionally determines whether or not to calculate another updated value for the coalescing depth or the coalescing rate (as described with reference to block 220). For example, if method 230 omits block 220 and the host computer simply updates the coalescing depth to a depth corresponding to the target coalescing rate or the coalescing rate to the target coalescing rate, method 200 may omit block 230 and return to block 205. Alternatively, if block 220 is included in method 200, the host computer determines if additional iterations of gradual increases or decreases to the coalescing depth or rate are to be implemented prior to reevaluating utilization and reselecting a target coalescing depth or rate. Following the examples above, if the updated value is calculated every 200 milliseconds and the score is calculated every second, the updated value is calculated five times to every time the score is calculated. If additional iterations of calculating the updated value for the coalescing depth or rate remain, method 200 returns to block 220. Otherwise, method 200 returns to block 205.

While method 200 is described with reference to a first VM, the host computer can perform method 200 for multiple VMs. For example, the determined pCPU utilization value may be used in determining a coalescing rate for both the first VM and a second VM. The host computer further determines vCPU utilization value(s) for the second VM, calculates a score, selects a target coalescing rate or depth based upon the score, and updates the coalescing rate or depth for the second VM as described above.

Figure 3:
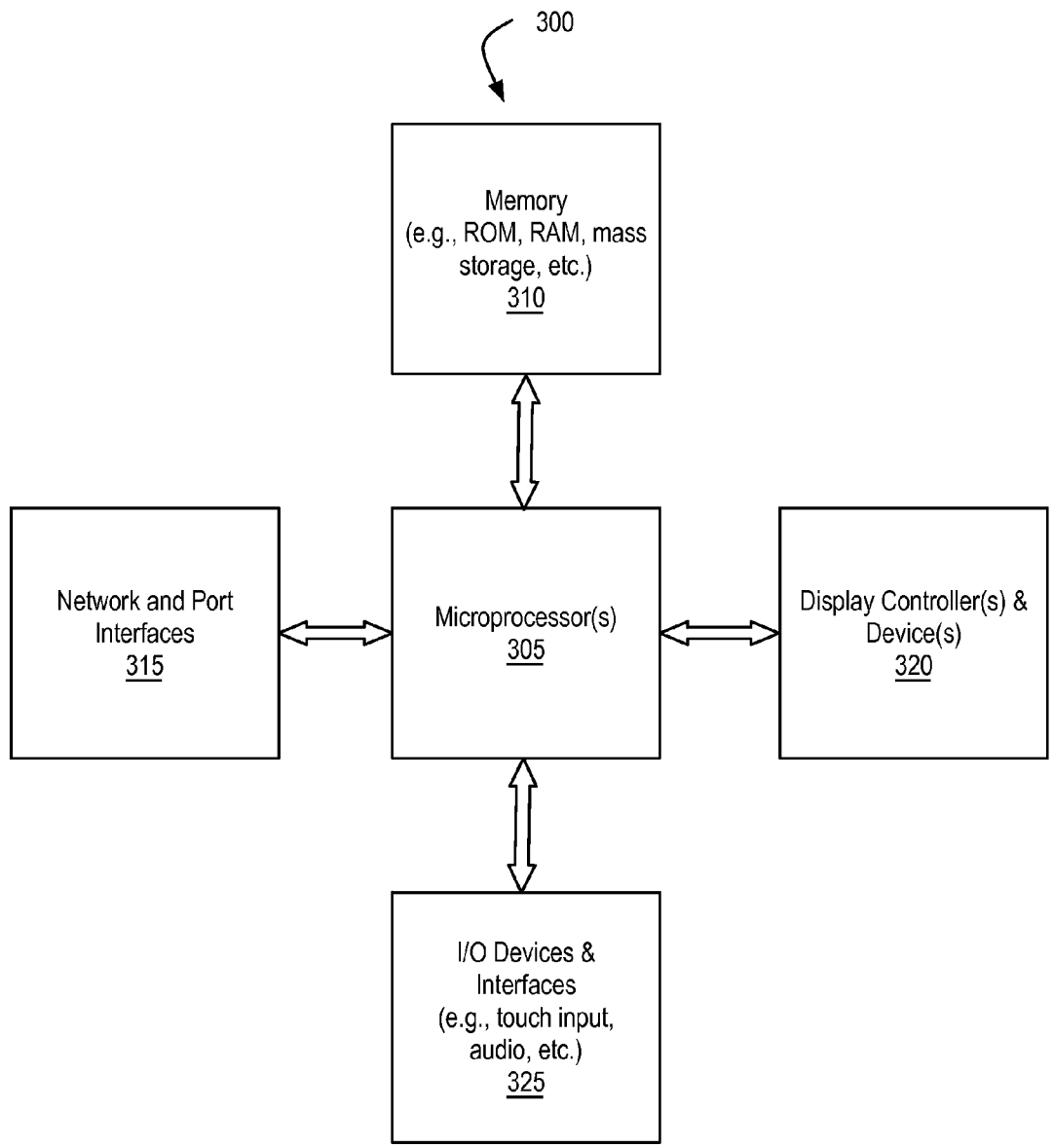
FIG. 3 illustrates, in block diagram form, an exemplary processing system to serve as a host computer and implement an adaptive approach to interrupt and system call coalescing.

FIG. 3 illustrates, in block diagram form, an exemplary processing system to serve as a host computer and implement an adaptive approach to interrupt and system call coalescing. Data processing system 300 includes one or more microprocessors 305 and connected system components (e.g., multiple connected chips). Alternatively, data processing system 300 is a system on a chip.

Data processing system 300 includes memory 310, which is coupled to microprocessor(s) 305. Memory 310 may be used for storing data, metadata, and programs for execution by the microprocessor(s) 305. Memory 310 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 310 may be internal or distributed memory.

Data processing system 300 includes network and port interfaces 315, such as a port, connector for a dock, or a connector for a USB interface, FireWire, Thunderbolt, Ethernet, Fibre Channel, etc. to connect the system 300 with another device, external component, or a network. Exemplary network and port interfaces 315 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 300 with another device, external component, or a network and receive stored instructions, data, tokens, etc.

Data processing system 300 also includes display controller and display device 320 and one or more input or output ("I/O") devices and interfaces 325. Display controller and display device 320 provides a visual user interface for the user. I/O devices 325 allow a user to provide input to, receive output from, and otherwise transfer data to and from the system. I/O devices 325 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 3.

Data processing system 300 is an exemplary representation of host computer 100 described above. Data processing system 300 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 300 may be a network computer, server, or an embedded processing device within another device or consumer electronic product. As used herein, the terms computer, device, system, processing system, processing device, and "apparatus comprising a processing device" may be used interchangeably with data processing system 300 and include the above-listed exemplary embodiments.

It will be appreciated that additional components, not shown, may also be part of data processing system 300, and, in certain embodiments, fewer components than that shown in FIG. 3 may also be used in data processing system 300.

It will be apparent from this description that aspects of the inventions may be embodied, at least in part, in software. That is, the computer-implemented method 200 may be carried out in a computer system or other data processing system 300 in response to its processor or processing system 305 executing sequences of instructions contained in a memory, such as memory 310 or other non-transitory machine-readable storage medium. The software may further be transmitted or received over a network (not shown) via network interface device 315. In various embodiments, hardwired circuitry may be used in combination with the software instructions to implement the present embodiments. Thus, the techniques are not limited to any specific combination of hardware circuitry and software, or to any particular source for the instructions executed by data processing system 300.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
   determining a first virtual processing unit utilization value representing utilization for a first virtual machine of a plurality of virtual machines running on a host computer;
   determining a host processing unit utilization value representing utilization for the host computer including utilization by the plurality of virtual machines running on the host computer;
   calculating a utilization score using the first virtual processing unit utilization value and the host processing unit utilization value;
   selecting a first target coalescing rate based upon the calculated utilization score by mapping the calculated utilization score to the first target coalescing rate in a data structure; and
   updating a first coalescing rate or a first coalescing depth for the first virtual machine based upon the selected first target coalescing rate.

2. The computer-implemented method of claim 1, wherein the first coalescing rate is equal to a rate of events to be processed divided by the first coalescing depth.

3. The computer-implemented method of claim 1, wherein the first virtual processing unit utilization value is a weighted sum of (a) utilization of all virtual processing units that receive interrupts for packets received for the first virtual machine and completion of packets transmitted for the first virtual machine, (b) utilization of the all virtual processing units that are used to transmit packets for the first virtual machine, and (c) average utilization of all virtual processing units of the first virtual machine, wherein the host processing unit utilization value is a weighted average processing unit utilization of all physical processing units in the host computer, and wherein the calculated utilization score is equal to the sum of the virtual processing unit utilization weighted sum and the host processing unit utilization weighted average.

4. The computer-implemented method of claim 3, wherein calculating the score further comprises decreasing the score when a current rate of events to be processed is below a threshold.

5. The computer-implemented method of claim 1, further comprising:
   updating the first coalescing depth based upon the selected first target coalescing rate by gradually increasing or decreasing the first coalescing depth to have the first coalescing rate approach the selected first target coalescing rate.

6. The computer-implemented method of claim 1, further comprising:
   updating the first coalescing rate based upon the selected first target coalescing rate by gradually increasing or decreasing the first coalescing rate to have the first coalescing rate approach the selected first target coalescing rate.

7. The computer-implemented method of claim 1, further comprising:
   implementing a virtual network interface card for the first virtual machine, wherein the first coalescing rate is set for use by the virtual network interface card.

8. The computer-implemented method of claim 1, further comprising:
   determining a second virtual processing unit utilization value representing utilization for a second virtual machine of the plurality of virtual machines running on a host computer;
   selecting a second target coalescing rate based upon the second virtual processing unit utilization value and the host processing unit utilization value; and
   updating a second coalescing rate or a second coalescing depth for the second virtual machine based upon the selected second target coalescing rate.

9. A non-transitory computer-readable medium storing instructions, which when executed by a processing device, cause the processing device to perform a method comprising:
   determining a first virtual processing unit utilization value representing utilization for a first virtual machine of a plurality of virtual machines running on a host computer;
   determining a host processing unit utilization value representing utilization for the host computer including utilization by the plurality of virtual machines running on the host computer;
   calculating a utilization score using the first virtual processing unit utilization value and the host processing unit utilization value;
   selecting a first target coalescing rate based upon the calculated utilization score by mapping the calculated utilization score to the first target coalescing rate in a data structure; and
   updating a first coalescing rate or a first coalescing depth for the first virtual machine based upon the selected first target coalescing rate.

10. The non-transitory computer-readable medium of claim 9, wherein the first coalescing rate is equal to a rate of events to be processed divided by the first coalescing depth.

11. The non-transitory computer-readable medium of claim 9, wherein the first virtual processing unit utilization value is a weighted sum of (a) utilization of all virtual processing units that receive interrupts for packets received for the first virtual machine and completion of packets transmitted for the first virtual machine, (b) utilization of the all virtual processing units that are used to transmit packets for the first virtual machine, and (c) average utilization of all virtual processing units of the first virtual machine, wherein the host processing unit utilization value is a weighted average processing unit utilization of all physical processing units in the host computer, and wherein the calculated utilization score is equal to the sum of the virtual processing unit utilization weighted sum and the host processing unit utilization weighted average.

12. The non-transitory computer-readable medium of claim 11, wherein calculating the score further comprises decreasing the score when a current rate of events to be processed is below a threshold.

13. The non-transitory computer-readable medium of claim 9, the method further comprising:
   updating the first coalescing depth based upon the selected first target coalescing rate by gradually increasing or decreasing the first coalescing depth to have the first coalescing rate approach the selected first target coalescing rate.

14. The non-transitory computer-readable medium of claim 9, the method further comprising:
updating the first coalescing rate based upon the selected first target coalescing rate by gradually increasing or decreasing the first coalescing rate to have the first coalescing rate approach the selected first target coalescing rate.

15. The non-transitory computer-readable medium of claim 9, further comprising:
implementing a virtual network interface card for the first virtual machine and the first coalescing rate is set for use by the virtual network interface card.

16. The non-transitory computer-readable medium of claim 9, the method further comprising:
determining a second virtual processing unit utilization value representing utilization for a second virtual machine of the plurality of virtual machines running on a host computer;
selecting a second target coalescing rate based upon the second virtual processing unit utilization value and the host processing unit utilization value; and
updating a second coalescing rate or a second coalescing depth for the second virtual machine based upon the selected second target coalescing rate.

17. A host computer comprising:
a processing device; and
a memory coupled to the processing device, the memory storing instructions which, when executed by the processing device, cause the host computer to perform a method comprising:
determining a first virtual processing unit utilization value representing utilization for a first virtual machine of a plurality of virtual machines running on the host computer;
determining a host processing unit utilization value representing utilization for the host computer including utilization by the plurality of virtual machines running on the host computer;
calculating a utilization score using the first virtual processing unit utilization value and the host processing unit utilization value;
selecting a first target coalescing rate based upon the calculated utilization score by mapping the calculated utilization score to the first target coalescing rate in a data structure; and
updating a first coalescing rate or a first coalescing depth for the first virtual machine based upon the selected first target coalescing rate.

18. The host computer of claim 17, wherein the first virtual processing unit utilization value is a weighted sum of (a) utilization of all virtual processing units that receive interrupts for packets received for the first virtual machine and completion of packets transmitted for the first virtual machine, (b) utilization of the all virtual processing units that are used to transmit packets for the first virtual machine, and (c) average utilization of all virtual processing units of the first virtual machine, wherein the host processing unit utilization value is a weighted average processing unit utilization of all physical processing units in the host computer, and wherein the calculated utilization score is equal to the sum of the virtual processing unit utilization weighted sum and the host processing unit utilization weighted average.

19. The host computer of claim 18, wherein selecting the first target coalescing rate further comprises decreasing the score when a current rate of events to be processed is below a threshold.

20. The host computer of claim 17, wherein the host computer updates the first coalescing depth based upon the selected first target coalescing rate by gradually increasing or decreasing the first coalescing depth to have the first coalescing rate approach the selected first target coalescing rate.

\* \* \* \* \*